MATRIX POSITIONING DEVICE

Filed Dec. 29, 1960 2 Sheets-Sheet 1

INVENTOR.
PETER BETTS
BY [signature]

United States Patent Office

3,186,317
Patented June 1, 1965

3,186,317
MATRIX POSITIONING DEVICE
Peter Betts, San Jose, Calif., assignor to International Business Machines Corporation, New York, N.Y., a corporation of New York
Filed Dec. 29, 1960, Ser. No. 79,301
16 Claims. (Cl. 95—4.5)

This invention relates generally to discrete positioning devices and in particular to a positioning device for matrix selection.

There has been a need for a electrical actuator capable of assuming a number of discrete positions with great speed and accuracy. Such device is a prime requirement for optical printing systems using a positionable matrix containing the indicia to be recorded. High speed is a necessity since the output of the system will necessarily be limited by the speed with which the matrix can be positioned. Good accuracy is required to provide proper registration between successive printing operations.

The positioning device of my invention utilizes a plurality of electromagnetic solenoids, each of which have an armature pivotally attached to an actuating arm which in turn is pivotally attached to an optical matrix. The pivotal attachment of the armatures to the arms permits the arm to be pivoted, at the point of attachment to the de-energized solenoids, by actuation of the remaining solenoids. By selecting various of the combinations of energized and de-energized solenoids the pivot point and the throw is changed thereby moving the arm to a plurality of discrete positions.

In my invention, two such positioners are pivotally coupled to the matrix holder so that the relatively linear motion of each actuator arm is transformed to rotational motion of the matrix about the point of connection of the mask holder to the other actuator arm.

It is therefore an object of my invention to provide an improved positioner.

It is another object of my invention to provide an improved electromagnetic actuator for discrete positioning.

Another object of my invention is to provide an improved positioning means for an optical matrix.

The foregoing and other objects, features, and advantages of the invention will be apparent from the following more particular description of preferred embodiments of the invention, as illustrated in the accompanying drawings.

FIGS. *3a–3g* illustrate in schematic form the positions of the actuator arm for various combinations of energized and de-energized solenoids.

Figures 1, 2, 4:
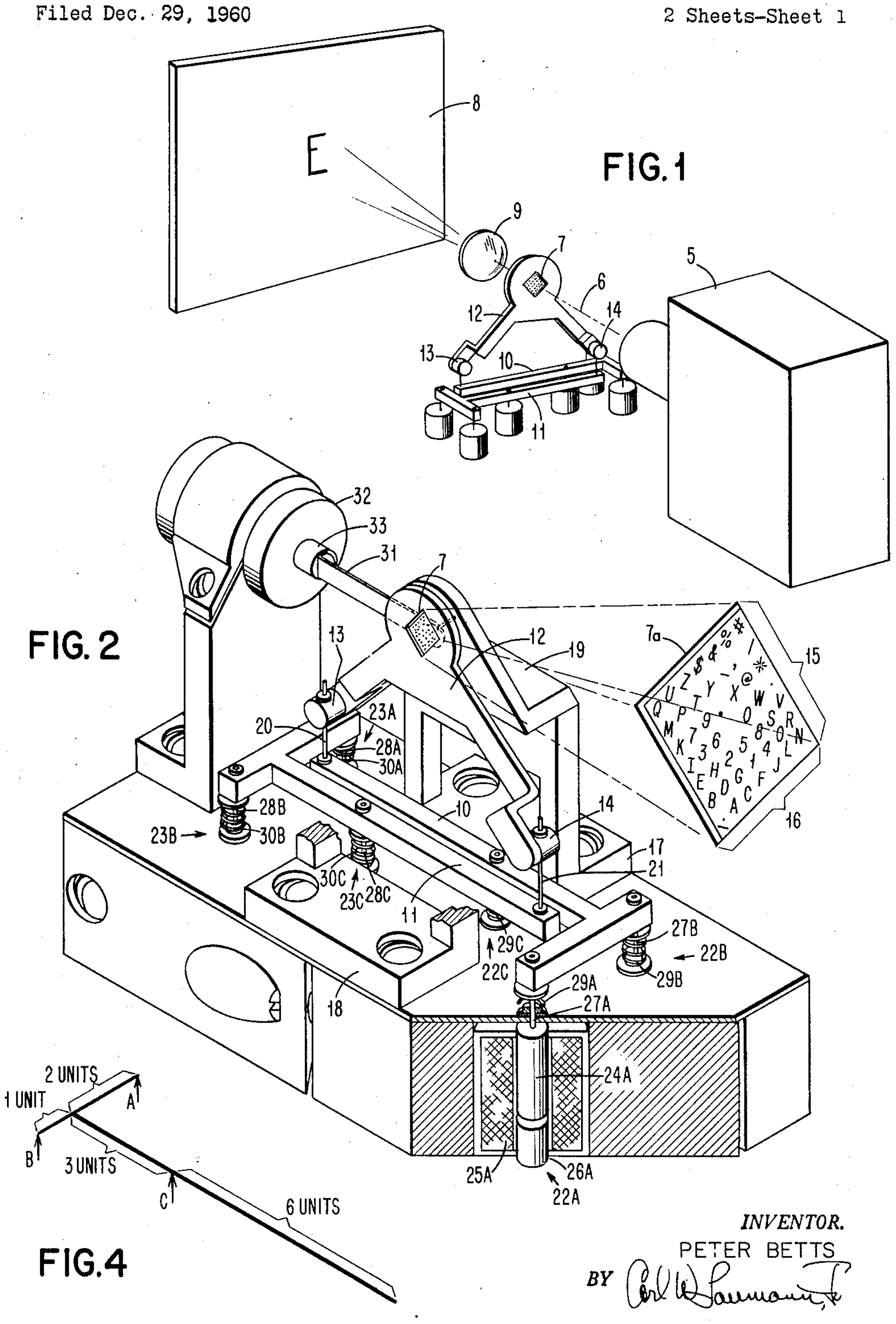
FIGURE 1 is a pictorial representation of an optical projection system utilizing the invention.
FIG. 2 is an isometric view, with parts cut away, of the matrix actuator of this invention.
Figure 5A:
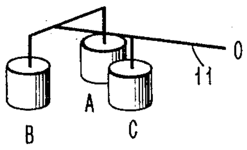
Figure 5B:
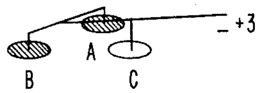

FIG. 4 is a schematic representation of the arm and solenoid arrangement.

FIGS. *5a–5h* illustrate the various positions of the actuator arm for another embodiment of my invention.

In FIG. 1 a light source 5 projects a collimated beam 6 against matrix 7 which is an optical mask bearing transparent indicia. The selected character is positioned in the beam 6 and the character image is projected on screen 8 by means of lens system 9. Although lens 9 is shown as projecting an enlarged image it will be understood that certain applications may require projection of a reduced image. Selection of the desired character in the matrix is accomplished by means of actuator arms 10 and 11 pivotally connected to matrix holder 12 at points 13 and 14.

FIGURE 2 illustrates in greater detail the mechanism of the matrix positioning means. The matrix 7, shown enlarged at *7a*, contains indicia arranged in rows 15 and columns 16. Matrix holder 12 is positioned between guides 17 and 18, a portion of 18 being cut away in the drawing. The face plate 19 and the corresponding portion of guide 18, which is not shown, coact to guide matrix holder 12 in planar movement according to the position of actuator arms 10 and 11.

Face plate 19 has an aperture of sufficient size to transmit a single character image developed by matrix 7. Any desired character may be selected by moving the matrix to align the appropriate character with the aperture.

Movement of the matrix to the desired position is accomplished by means of actuator arms 10 and 11. The extremities of arms 10 and 11 are connected by means of flexible wires 20 and 21 to pivot points 13 and 14 respectively. Each of the wires 20 and 21 is of sufficient diameter and stiffness to prevent buckling under the load of matrix holder 12 but is flexible enough to compensate for the changes in alignment between the arms 10 and 11 and the connection points 13 and 14. While the preferred embodiment of my invention utilizes connections at 13 and 14 which provide pivotal attachment to matrix holder 12, entirely satisfactory device results where the desired freedom of movement is provided by the flexing of wire supports 20 and 21. The pivot means at 13 and 14 reduce the actuating force required to position the matrix holder 12. They would not be required where sufficient power is available from the actuators or where the slight delay introduced by the additional required force can be tolerated.

Movement of the actuator arms 10 and 11 is accomplished by six electromagnetic actuators, three to each arm. The actuators may take the form of solenoids as shown. Arm 10 is moved by solenoids 22A, 22B and 22C. Arm 11 is moved by solenoids 23A, 23B and 23C. Solenoid 22A, shown cut away, having a movable armature 24A, a winding 25A and a housing 26A is also illustrative of the solenoids 22B, 22C, 23A, 23B and 23C.

The armatures of the solenoids are connected to the actuator arms 10 and 11 by means of flexible wires 27A, 27B, 27C, 28A, 28B and 28C respectively. Springs 29A, 29B, 29C, 30A, 30B and 30C urge the de-energized solenoid armatures to the upper limit of travel. When all solenoids are de-energized, the armatures of each will be at the upper limit of travel and arms 10 and 11 are considered to be in the neutral position. The center position or character of the matrix 7 is in position before the aperture in face plate 19.

No image is projected through the aperture until shutter 31 is withdrawn from position between the matrix 7 and the aperture. When it is desired to project an image through the aperture solenoid 32 is energized to attract armature 33 and withdraw shutter 31 thereby allowing projection of the image through the aperture in face plate 19.

Character selection is accomplished by energizing appropriate solenoids to move arms 10 and 11 and thereby position the matrix holder to the desired character. From the foregoing description it can be seen that movement of arm 11 causes the matrix holder to rotate about point 13. Rotation in this direction results in selection of a particular row of characters. In a similar manner, movement of arm 10 causes the matrix holder to rotate about point 14 to select a particular column of characters. In the matrix shown there are seven columns and seven rows. The number of rows and columns is equal to the number of discrete positions which may be assumed by arms 10 and 11. Thus, there is one arm position corresponding to each row and column of the matrix.

Figure 3A:
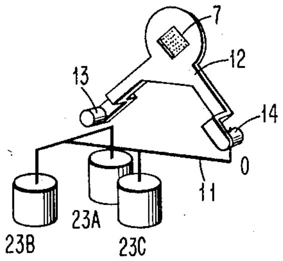
Figure 3B:
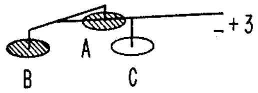
Figure 5C:
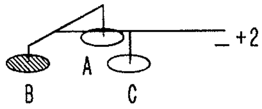
Figure 3C:
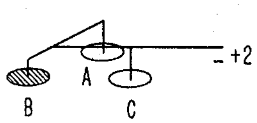
Figure 5D:
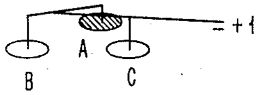
Figure 3D:
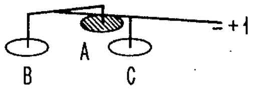
Figure 5E:
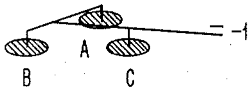
Figure 3E:
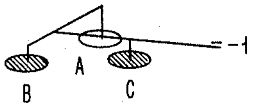
Figure 5F:
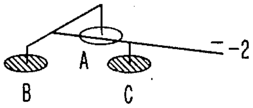
Figure 3F:
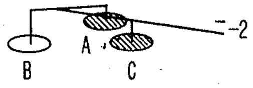
Figure 5G:
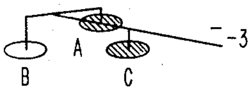
Figure 3G:
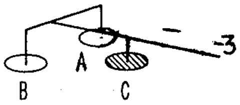
Figure 5H:
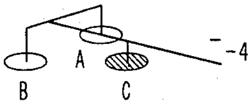

The seven positions are explained with reference to FIG. 3 which shows the movement of arm 11. FIG. *3a* depicts in schematic form the de-energized or neutral position in which none of the solenoids is energized. For sake of explanation this may be referred to as the 0 position. In FIG. 3*b* solenoids 23A and 23B have been energized causing arm 11 to pivot about the point of attachment to the armature of solenoid 23C. The end of arm 11 has moved three units in the upward direction to the +3 position. If solenoids A, B and C are assigned values of +1, +2, and −3 respectively, then the arm position may be determined by adding the values of the energized solenoids. For example, in FIG. 3*c* solenoid 23B is energized to pivot arm 11 along a line between the points of attachment to the armatures of solenoids 23A and 23C. Since solenoid B has a value of +2 the end of arm 11 is at +2 units. The arm is positioned at +1 unit by energizing solenoid 23A which pivots arm 11 along a line between the points of attachment to the armature of solenoids 23B and 23C.

The negative positions, which lie beneath the neutral or 0 position are obtained by energizing solenoid 23C which has a value of −3, and appropriate combinations of 23A and 23B as required. For example, the −1 position is obtained by energizing 23B and 23C. This causes arm 11 to pivot about the point of connection to the armature of solenoid 23B. Arm 11 is moved to the −2 position by energizing solenoids 23A and 23C, causing the arm to pivot about the point of connection to the armature of solenoid 23B. Movement to the −3 position results when only solenoid 23C is energized, causing arm 11 to pivot about the points of connection to the armatures of solenoids 23A and 23B.

To obtain seven positions with three solenoids, the arm is constructed in the proportions shown in FIG. 4. It can be seen that solenoids A and B are separated by thre units. The portion of the arm extending to solenoid C is three units long and joins the arm between solenoids A and B at a point one unit from B and two units from A. The arm extends 6 units outwardly from solenoid C to the point of attachment to the matrix holder.

The armatures of solenoids A and B have equal throws which are selected to give the desired movement of the actuator arm. It is desirable to make the armature movement relatively small in comparison to the distance between the solenoids. The armature of solenoid C provides a throw which is ⅔ of that provided by solenoids A and B.

FIG. 5 is a showing of a second embodiment of the invention which provides eight positions instead of seven. A combination of two such devices in an arrangement according to FIG. 2 would provide access to any of 64 matrix positions. In this second embodiment, certain positions are obtained in the same manner as shown in FIG. 3. For example, the +3, +2, +1 and 0 positions are obtained by the same combinations of energized and de-energized solenoids as the embodiment of FIG. 3.

However, in the embodiment of FIG. 5, the armature of solenoid C has a throw which is equal to that of solenoids A and B. This changes the combinations for the −1, −2 and −3 positions and results in an additional, −4, position. The−1 position is reached by energizing solenoids A, B and C, to position the arm parallel to the 0 position but displaced by one unit in the negative direction. In this embodiment, the length of the arm beyond solenoid C is limited to that which produces a distance between positions equal to the armature throw. This limitation does not exist in the embodiment of FIG. 3.

The −2 position is obtained by energizing solenoids B and C. Thus, if solenoids A and B are again assigned the value of +1 and +2 respectively and C is now given −4, the same means of determining the arm position may be used as was employed with respect to FIG. 3. The −3 position results when solenoids A and C are energized and the −4 position results from energizing only solenoid C.

The embodiment of FIG. 5 differs from that of FIG. 3 in that all solenoid armatures have equal throws. The spacing of the solenoids and the point of connection between the arm connected to solenoid C and the arm joining solenoids A and B is the same.

In both of the embodiments shown and described the actuator arm is composed of two segments disposed at right angles. This configuration is convenient but not the only satisfactory arrangement since solenoid C may be located at any point three units from the junction between the two segments which is one unit from solenoid B and two units from solenoid A. In some cases this may produce a more acceptable package for the device but the mode of operation remains unchanged.

While the invention has been particularly shown and described with reference to preferred embodiments thereof, it will be understood by those skilled in the art that various changes in form and details may be made therein without departing from the spirit and scope of the invention.

What is claimed is:

1. A positioning device comprising: a movable arm, first, second and third actuators, first, second and third output members respectively operated by said actuators, pivot means individually connecting said output members to said arm at spaced points, a reference point on said arm, said points of connection being related to the movement of the particular actuator whereby each energized actuator produces equal movement at points 1, 2 and 3 distance units from said reference point, and utilization means connected to said arm 9 distance units from said reference point and 6 distance units from said 3 distance unit point.

2. A positioning device comprising: a movable arm, first, second and third actuators first, second and third output members respectively operated by said actuators, pivot means individually connecting said output members to said arm at spaced points, a reference point on said arm, said points of connection being related to the movement of the particular actuator whereby said first and second actuators produce equal movement of said arm points at 1 and 2 distance units from said reference point when energized and said third actuator produces, at a point 3 distance units from said reference points, ⅔ of the movement of said first or second actuators, and utilization means connected to said arm 9 distance units from said reference point and 6 distance units from said 3 distance unit point.

3. A positioning device comprising: a movable arm having an output leg, first, second and third actuators having parallel movements, first, second and third members respectively operated by said actuators, pivot means individually connecting said output members to said arm at spaced points, a reference point on said arm, said points of connection being related to the movement of the particular actuator whereby said first and second actuators produce equal movement at locations 1 and 2 distance units from said reference point when energized and said third actuator produces, at a location 3 distance units from said reference point ⅔ of the movement of said first or second actuators, whereby said arm rotates about the point of connection to the de-energized of said actuators to provide a plurality of discrete equally spaced positions of said output leg in first and second directions from the de-energized position.

4. A positioning device comprising: a movable arm having an output leg, first second and third actuators having parallel movements, first, second and third output members respectively operated by said actuators, means individually connecting said actuators to said arm at spaced points, a reference point on said arm, said points of connection being related to the movement of the particular actuator whereby each energized actuator produces equal movement at locations 1, 2 and 3 distance units from said reference point, said reference point and two of said locations lying in a straight line, whereby said arm rotates about the point of connection to the de-energized of said actuators to provide a plurality of discrete positions of said output leg in each of first and second directions from the de-energized position.

5. A positioning device comprising: a movable arm having an output leg, first, second and third actuators having parallel movements, first, second and third output members respectively operated by said actuators, pivot means individually connecting said output members to said arm at spaced points, a reference point on said arm, said points of connection being related to the movement of the particular actuator whereby said first and second actuators produce equal movement at locations 1 and 2 distance units from said reference point when energized and said third actuator produces, at a location 3 distance units from said reference point, ⅔ of the movement of said first or second actuators, said reference point and two of said locations lying in a straight line, whereby said arm rotates about the point of connection to the de-energized of said actuators to provide a plurality of discrete positions of said output leg in each of first and second directions from the de-energized position.

6. A positioning device comprising: a movable arm having an output leg, first, second and third actuators having parallel throws, first, second and third output members respectively operated by said actuators, a reference point on said arm, first means connecting said first output member to said arm at a first point 1 distance unit from said reference, second means connecting said second output member to said arm at a second point 2 distance units from said reference, means connecting said third output member to said arm at a third point 3 distance units from said reference, whereby said arm rotates about the point of connection to the de-energized of said actuators, to provide a plurality of discrete positions of said output leg in each of first and second directions from the de-energized position.

7. A positioning device comprising: a movable arm having an output leg, first and second actuators having equal parallel throws, first, second and third output members respectively operated by said actuators, a third actuator having a throw ⅔ that of said first or second actuator and parallel thereto, a reference point on said arm, first means connecting said first output member to said arm at a first point 1 distance unit from said reference, second means connecting said second output member to said arm at a second point 2 distance units from said reference, said first and second reference points, lying in a straight line, third means connecting said third output member to said arm at a third point 3 distance units from said reference, whereby said arm rotates about the point of connection to the de-energized of said actuators, to provide a plurality of discrete positions of said output leg in first and second directions from the de-energized position.

8. A positioning device comprising: a movable arm having an output leg, first, second and third actuators having parallel throws, first second and third output members respectively operated by said actuators a reference point on said arm, first pivot means connecting said first output member to said arm at a first point 1 distance unit from said reference, second pivot means connecting said second output member to said arm at a second point 2 distance units from said reference, said first and second and reference points lying in a straight line, means connecting said third output member to said arm at a third point 3 distance units from said reference, whereby said arm rotates about the point of connection to the de-energized of said actuators, to provide a plurality of discrete positions of said output leg in first and second directions from the de-energized position.

9. In a projection system: a mask containing a plurality of transparent indicia arranged in columns and rows, a movable holder containing said mask and having a column select leg parallel to said rows and a row select leg parallel to said columns; means for selecting said indicia comprising first and second movable arms, means connecting said first and second arms to said column and row select legs respectively, first, second and third actuators for said first arm, fourth, fifth and sixth actuators for said second arm, first and second reference points on said first and second arms, respectively, means connecting said first actuator to said first arm at a first point 1 unit from said reference point, means connecting said second actuator to said first arm at a second point 2 units from said first reference point, means connecting said third actuator to said first arm at a third point 3 units from said first reference point, means connecting said fourth actuator to said second arm at a fourth point 1 unit from said second reference point, means connecting said fifth actuator to said second arm at a fifth point 2 units from said second reference point, means connecting said sixth actuator to said second arm at a sixth point 3 units from said second reference point, and means for selectively energizing said actuators whereby said arms pivot about the point of connections to said de-energized actuators to provide a plurality of discrete positions of said arms in two directions from the de-energized positions whereby movement of said second arm causes rotation of said holder about the point of connection to said first arm to select the desired row and movement of said first arm causes rotation of said holder about the point of connection to said second arm to the desired column.

10. In a projection system, a movable mask containing a plurality of transparent indicia arranged in rows and columns, selector means for said indicia comprising: a movable arm, means connecting said arm to said mask, first, second and third actuators having parallel movements, pivot means individually connecting said actuators to said arm at spaced points, a reference point on said arm, said points of connection being related to the movement of the particular actuator whereby each energized actuator produces equal movement at locations 1, 2 and 3 distance units from said reference point, whereby said arm rotates about the point of connection to said de-energized actuators.

11. In a projection system, a movable mask containing a plurality of transparent indicia arranged in rows and columns, first and second selector means for said indicia, each said selector means comprising: a movable arm, first, second and third electromagnetic actuators having pivot means individually connecting said actuators to said arm at spaced points, whereby said arm rotates about the point of connection to the de-energized of said actuators to provide a plurality of discrete positions of the extremity of said arm in first and second directions from the de-energized position, and means individually connecting said mask to the respective arms of said first and second select means whereby movement of said second selector means causes rotation of said mask about a first point to select the desired row, and movement of said first select means causes rotation of said mask about a second point to select the desired column.

12. A positioning device comprising,
- first, second and third actuators, first, second and third output members respectively operated by said actuators,
- a first arm section,
- pivot means connecting said first and second output members to said first arm at locations three distance units apart,
- a second arm section,
- means connecting said second arm section to said first arm section at a point one distance unit from the connection to said first output member and two distance units from the connection to said second output member,
- pivot means connecting said third output member to said second arm section at a point three distance units from the junction between said arms, and
- utilization means connected to said second arm at a point along a straight line intersecting said reference point and the connection of said third output member and said second arm and lying on the portion of said line disposed away from the segment between said reference point and connection to said third output member.

13. A positioning device comprising,
first, second and third actuators, first, second and third output members respectively operated by said actuators in parallel equal length movements,
a first arm section,
pivot means connecting said first and second output members to said first arm at locations three distance units apart,
a second arm section,
means connecting said second arm section to said first arm section at a point one distance unit from the connection to said first output member and two distance units from the connection to said second output member,
pivot means connecting said third output member to said second arm section at a point three distance units from the junction between said arms, and
utilization means connected to said second arm at a point along a straight line intersecting said reference point and the connection of said third output member and said second arm and lying on the portion of said line disposed away from the segment between said reference point and connection to said third output member.

14. A positioning device comprising,
first, second and third actuators, first, second and third output members respectively operated by said actuators in parallel equal length movements,
a first arm section,
pivot means connecting said first and second output members to said first arm at locations three distance units apart,
a second arm section,
means connecting said second arm section to said first arm section at a point one distance unit from the connection to said first output member and two distance units from the connection to said second output member,
pivot means connecting said third output member to said second arm section at a point three distance units from the junction between said arms, and
utilization means connected to said second arm at a point six distance units from the connection to said third output member in a direction away from the junction between said arms.

15. A positioning device comprising,
first, second and third actuators, first, second and third output members respectively operated by said actuators, a first arm section having first and second points thereon three distance units apart,
pivot means connecting said first and second output members to said first arm whereby each of said first and second actuators, when energized, provides equal movement of said arm at said first and second points, respectively,
a second arm section,
means joining said second arm section to said first arm section at a point one distance unit from said first point and two distance units from said second point,
pivot means connecting said third output member to said second arm section at a point three distance units from the junction between said arms, and
utilization means connected to said second arm at a point along a straight line intersecting said reference point and the connection of said third output member and said second arm and lying on the portion of said line disposed away from the segment between said reference point and connection to said third output member.

16. A positioning device comprising,
first, second and third actuators, first, second and third output members respectively operated by said actuators,
a first arm section having first and second points thereon three distance units apart,
pivot means connecting said first and second output members to said first arm whereby each of said first and second actuators, when energized, provides equal movement of said arm at said first and second points, respectively,
a second arm section,
means joining said second arm section to said first arm section at a point one distance unit from said first point and two distance units from said second point,
pivot means connecting said third output member to said second arm section at a point three distance units from the junction between said arms, and
utilization means connected to said second arm at a point six distance units from the connection to said third output member.

References Cited by the Examiner

UNITED STATES PATENTS

| | | | |
|---|---|---|---|
| 1,127,160 | 2/15 | Baker | 74—479 |
| 2,887,936 | 5/59 | Spievak | 95—4.5 |
| 2,889,109 | 6/59 | O'Brien | 235—200 |

NORTON ANSHER, *Primary Examiner.*

JOHN H. HORAN, *Examiner.*

UNITED STATES PATENT OFFICE
CERTIFICATE OF CORRECTION

Patent No. 3,186,317

June 1, 1965

Peter Betts

It is hereby certified that error appears in the above numbered patent requiring correction and that the said Letters Patent should read as corrected below.

Column 4, line 41, for "points" read -- point --; line 48, after "third" insert -- output --; column 6, lines 28, 41, 42, and 51, for "selector", each occurrence, read -- select --.

Signed and sealed this 16th day of November 1965.

(SEAL)
Attest:

ERNEST W. SWIDER
Attesting Officer

EDWARD J. BRENNER
Commissioner of Patents